United States Patent
Rigby (10) Patent No.: US 6,366,227 B1
(45) Date of Patent: Apr. 2, 2002

(54) DELTA-SIGMA BEAMFORMERS WITH MINIMAL DYNAMIC FOCUSING ARTIFACTS

(75) Inventor: Kenneth Wayne Rigby, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/535,798

(22) Filed: Mar. 28, 2000

(51) Int. Cl.[7] ................................................. H03M 3/00
(52) U.S. Cl. ....................................... 341/143; 341/155
(58) Field of Search ................................ 341/143, 144, 341/155, 139

(56) References Cited

U.S. PATENT DOCUMENTS

| | | | |
|---|---|---|---|
| 5,203,335 A | | 4/1993 | Noujaim et al. ............... 128/1 |
| 6,140,950 A | * | 10/2000 | Oprescu ..................... 341/155 |
| 6,252,531 B1 | * | 7/2001 | Gordon ...................... 341/155 |

OTHER PUBLICATIONS

Freeman et al., "An Ultrasound Beamformer Using Oversampling," 1997 IEEE Ultrasonics Symposium Proceedings (on CD–R(M).

* cited by examiner

Primary Examiner—Brian Young
(74) Attorney, Agent, or Firm—Toan P. Vo; Noreen C. Johnson (57) ABSTRACT

Techniques for minimizing artifacts resulting from ultrasound time-delay focusing while using a single-bit delta-sigma analog-to-digital converter for each beamformer channel include correcting the dynamic focus artifact in a delta-sigma beamformer by always inserting a pair of samples having a zero sum when a delay is required. Using other techniques, the dynamic focus artifact is not eliminated on each beamforming channel, but rather is eliminated in the beamsummed, reconstructed signal. In one technique, samples having a zero sum are respectively inserted on a pair of symmetric channels such that the net effect on the beamsummed signal is zero. In another technique, a +1 sample is inserted when a focus time delay is required, and either a pre-calculated or counted number of channels having a focus time delay at each time sample is subtracted from the beamsum.

20 Claims, 7 Drawing Sheets

DELTA-SIGMA BEAMFORMERS WITH MINIMAL DYNAMIC FOCUSING ARTIFACTS

FIELD OF THE INVENTION

The present invention relates to beamforming in ultrasound imaging systems and, more particularly, to dynamically focused digital beamformers which use delta-sigma modulators.

BACKGROUND OF THE INVENTION

A conventional ultrasound image is composed of multiple image scan lines. A single scan line (or small localized group of scan lines) is acquired by transmitting focused ultrasound energy at a point in the region of interest, and receiving the reflected energy over time. The focused transmit energy is referred to as a transmit beam. During the time after transmit, one or more receive beamformers coherently sum the energy received by each channel, with dynamically changing phase rotation or time delays, to produce peak sensitivity along the desired scan lines at ranges proportional to the elapsed time. The resulting focused sensitivity pattern is referred to as a receive beam. Resolution of a scan line is a result of directivity of the associated transmit and receive beam pair.

In a typical ultrasound imaging system, the output signals of the beamformer channels are coherently summed to form a respective pixel intensity value for each sample volume in the object region or volume of interest. These pixel intensity values are log-compressed, scan-converted and then displayed as an image of the anatomy being scanned.

Conventional ultrasound beamformers use dynamic focusing during reception of echoes. With this method, the beamformation process is optimized for each depth to achieve as good a beamshape (i.e., narrow beamwidth with low sidelobes) as possible. In most systems, a single fixed focus is used during transmit beamformation to try to maintain a good combined beamshape. In areas away from the transmit focus, the beamwidth of the resultant beam enlarges and the sidelobes increase. In the manufacture of an ultrasound system, the beamformer control is installed in either algorithmic or tabulated form.

In many conventional ultrasound imaging systems, time delay resolution in the beamforming circuitry of the receiver requires a large amount of hardware and consumes a large amount of power. The most recent designs sample each transducer element output signal using very accurate analog-to-digital converters (ADCs) which produce multi-bit digital numbers. These multi-bit numbers are delayed by separate circuitry, including first-in/first-out (FIFO) registers, decimators, and interpolators, before being summed with the separately delayed, multi-bit signals from each of the other transducer elements. This is a considerable amount of hardware for a conventional 128-element transducer array, and is an enormous amount of hardware when a two-dimensional transducer array having 512 or more elements is considered.

A delta-sigma modulator or converter is a circuit which converts an analog signal into a digital signal stream. Delta-sigma ($\Delta$-$\Sigma$) analog-to-digital converters have been proposed to radically reduce the size, cost and power consumption of digital ultrasound beamformers. Noujaim et al. U.S. Pat. No. 5,203,335, issued Apr. 20, 1993 and assigned to the instant assignee, sets forth advantages of the $\Delta$-$\Sigma$ converter for digital beamforming. The $\Delta$-$\Sigma$ converter produces a data stream with a small number of bits—in its purest form, a single bit at a data rate much higher than the Nyquist sampling frequency of the input signal. The converter output signal can be converted into a more familiar multiple-bit data stream, such as that produced by the traditional ADC, by filtering and decimating in time. To a reasonable approximation, the capacity of a digital data stream is nR, where n is the number of bits in the data and R is the data sample rate. Thus a 1-bit $\Delta$-$\Sigma$ converter running at 320 MHz is roughly the equivalent of an 8-bit, 40-MHz ADC.

The relatively high data rate of the $\Delta$-$\Sigma$ converter is attractive for digital time-delay beamforming. In its simplest form, a digital beamformer delays the digital data stream of each channel according to a receive focusing schedule, then sums over all the delayed data streams to produce a focused "beamsummed" signal. In this simple form, the resolution of the time delays which the beamformer can generate is the data sampling time interval. The 8-bit, 40-MHz ADC used in the example above is representative of what is currently available for ultrasound imagers. A sampling rate of $1/(40\times 10^6 \text{MHz}) = 25$ nsec is inadequate for all but the lowest imaging frequencies, so that various interpolation schemes are required. These increase the cost and complexity of the integrated circuit which implements the digital delay.

The sampling rate of the equivalent one-bit $\Delta$-$\Sigma$ converter is eight times higher, which is adequate for imaging at center frequencies up to about 10 MHz. A beamformer could simply delay, without interpolation, the $\Delta$-$\Sigma$ data streams. The beamsummed data would be filtered and decimated to reconstruct a multiple-bit signal which would be passed to the display processor of the imager.

The simplicity of the $\Delta$-$\Sigma$ beamformer architecture enables a reduced size with respect to the equivalent beamformer based upon ADCs. This means that the beamformer hardware could be moved from the ultrasound console into the probe itself. This has a number of important advantages. Currently a shielded signal line is required to connect each beamformer channel to the console. The bulk of these cables is a serious obstacle to increasing the channel count in ultrasound imagers. With a $\Delta$-$\Sigma$ beamformer in the probe, the channel signals are not brought to the console, so that the cable count is dramatically reduced. This reduces the transducer cable complexity (size and weight). Noise pickup in the cable is a serious concern currently, since the cable carries low-level analog signals. In a $\Delta$-$\Sigma$ beamformer, only the beamsummed digital signal need be transmitted to the console.

However, $\Delta$-$\Sigma$ beamformers are beset by a difficulty in practice. Delaying a digital signal by one sample, for example, requires insertion of some sample into the data stream. With a multiple-bit data stream, a sample could simply be repeated when the data stream is to be delayed. This introduces some waveform distortion on the scale of the change in the waveform over the sampling time interval, which is a relatively small error when the sampling time interval is sufficiently small. (In practice, traditional ultrasound machines implement delays using a combination of repeated sample and interpolation to relax the requirement on sampling time interval.)

The artifact produced by repeating a single-bit $\Delta$-$\Sigma$ sample is more severe, however. The reason is that the single-bit $\Delta$-$\Sigma$ data stream must at some point be low-pass-filtered to reconstruct a multiple-bit waveform. The relative error introduced by repeating a $\Delta$-$\Sigma$ sample is of order one divided by the filter length. The filter length will be of order of the oversampling ratio, which is currently limited by circuit speed to about 32 for a 10-MHz transducer frequency.

This inserted sample, therefore, produces a distortion in the output signal of order $20\log(\frac{1}{32})$ or about $-30$ dB. This is unacceptable for all but the least expensive of beamformers.

Freeman et al., in a paper entitled "An Ultrasound Beamformer Using Oversampling," 1997 IEEE Ultrasonics Symposium Proceedings, proposed three methods to correct the dynamic focus artifact. In one method, they proposed using a two-bit $\Delta$-$\Sigma$ converter, which produces a zero level in addition to the +1 and −1 levels of a one-bit $\Delta$-$\Sigma$ converter. This zero level is used when a sample must be inserted, which reduces the size of the artifact that survives the reconstruction filter. In a second method, they interpret the four levels of a two-bit converter as −1, −½, +½, and +1. They divide in half the sample to be repeated and spread it over two inserted samples. In the third method, they manipulate the gain in the feedback loop of the $\Delta$-$\Sigma$ converter to compensate for repeating a sample. There is a need for methods of correcting the dynamic focus artifact produced in $\Delta$-$\Sigma$ beamforming without requiring the complexity of a two-bit converter or manipulating the gain in the feedback loop.

SUMMARY OF THE INVENTION

In a preferred embodiment of the invention, artifacts resulting from time-delay focusing are minimized while the single-bit $\Delta$-$\Sigma$ converter for each channel is retained. This simplifies the architecture of the beamformer hardware, reducing its size and complexity. Preferred embodiments based on three different approaches are disclosed. Because there are advantages and disadvantages to each approach, the proper choice for a given application depends upon a cost-performance analysis.

In accordance with a first preferred embodiment of the invention, the dynamic focus artifact in a $\Delta$-$\Sigma$ beamformer is corrected using a method wherein a pair of samples, +1 and −1, are always inserted when a delay is required. This approach is similar to Freeman's approach, discussed above, of inserting a zero when a sample delay is required, but requires only a single-bit converter. Although the effective time-delay quantization interval is doubled relative to that in the Freeman teaching, for many applications this will not matter. This method reduces the focusing artifact on each beamforming channel.

In accordance with two other preferred embodiments of the invention, the delay artifact is not reduced on each beamforming channel, but rather is reduced in the beamsummed, reconstructed signal. In many applications, the range-dependent part of the focusing time delay is, to a good approximation, a function of the distance of an element from the aperture center. In this situation, focusing time delays always occur simultaneously on pairs of channels connected to pairs of transducer elements lying equidistant on either side of the aperture center. Thus, in accordance with a second preferred embodiment of the invention, a +1 is inserted on one channel and a −1 is inserted on the other channel of a pair of symmetric channels. The net effect on the beamsummed signal is zero, exactly as if a zero had been inserted on each of the two channels.

In other situations, it may not be possible or convenient to arrange the channels in such pairwise fashion. Thus, in accordance with a third preferred embodiment of the invention, a +1 sample is inserted when a focus time delay is required. This method either pre-calculates or counts the number of channels which are delayed at each time sample and then subtracts this number from the beamsum. The net effect on the beamsum is the same as inserting a zero sample on every channel which is delayed. Pre-calculating the delay count is a simple matter, but the added control and memory requirements must be weighed against the additional circuitry required to count the number of focus time delays on each sample. If in a particular implementation it is determined that counting the focus time delays is the better approach, then the focus time delay count can be either exact or approximate.

DETAILED DESCRIPTION OF THE PREFERRED EMBODIMENTS

Figure 1:
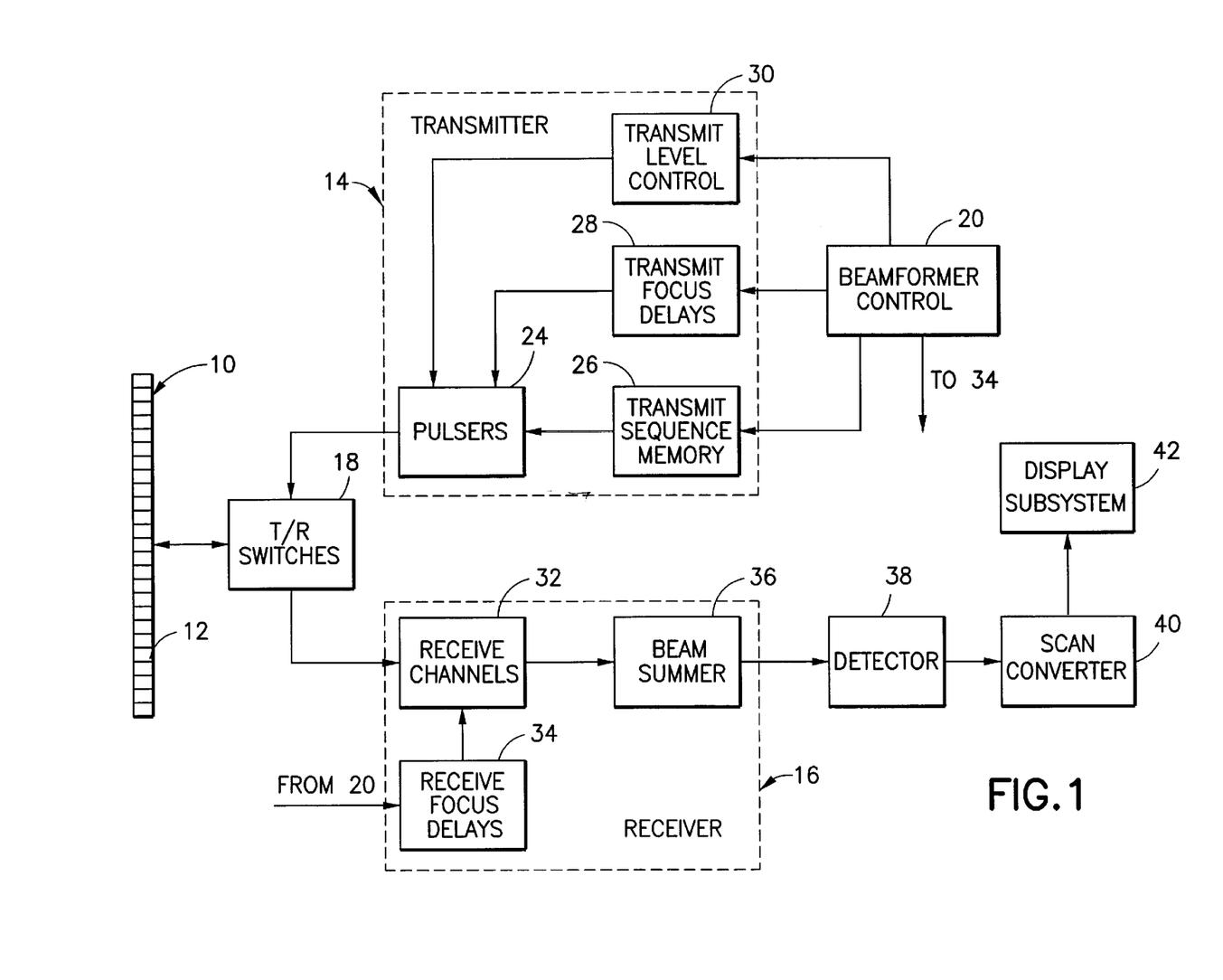
FIG. 1 is a block diagram depicting some of the functional components of a typical ultrasound imaging system incorporating means for time-delay focusing.

In FIG. 1, some of the functional components of a digital real-time ultrasound imaging system of a type which utilizes dynamic focusing in receive beamforming, is shown to comprise a transducer array 10 having a plurality of separately driven transducer elements 12, each of which produces a burst of ultrasonic energy when energized by a pulsed waveform produced by a transmitter 14. The ultrasonic energy reflected back to transducer array 10 from the object under study is converted to an electrical signal by each receiving transducer element 12 and applied separately to a receiver 16 through a set of transmit/receive (T/R) switches 18. Transmitter 14 and receiver 16 are operated under control of a beamformer controller 20. Optionally, the beamformer controller for receive focusing and transmit focusing may be in separate places. For example, the receive beamformer controller could be in the probe together with the delta-sigma beamformer, and the transmit controller could remain in the system console. A complete scan is performed by acquiring a series of echoes in which transmitter 14 is gated ON momentarily to energize each transducer element 12, and the subsequent echo signals produced by each transducer element 12 are applied to receiver 16. A channel may begin reception while another channel is still transmitting. Receiver 16 combines the separate echo signals from each transducer element to produce a single echo signal which is used to produce a line in an image on a monitor of a display subsystem 42.

In the system of FIG. 1, the base waveform transmitted by each transducer element is determined by a digital transmit sequence stored in a transmit sequence memory 26. Each transducer element 12 in the transmit aperture is pulsed by a pulse waveform, which is supplied by a respective pulser 24 in response to a respective transmit sequence provided to that pulser from transmit sequence memory 26. The transmit sequence is provided by beamformer controller 20.

Under the direction of beamformer controller 20, transmitter 14 drives transducer array 10 such that the ultrasonic energy is transmitted as a directed focused beam. To accomplish focusing, transmit focus delays 28 impart respective time delays to pulsers 24, while respective pulse amplitudes are set by transmit level control (i.e., apodization generator) 30. The transmit focus delays and transmit amplitudes, also provided by the beamformer controller, respectively determine the timing and amplitude of each of the transmit pulses to be generated by pulsers 24. Pulsers 24 in turn send the transmit pulses to each of elements 12 of transducer array 10 via T/R switches 18. By appropriately adjusting the transmit focus time delays in a conventional manner, an ultrasonic beam can be directed and focused at a transmit focal position. The beamformer controller is programmed with algorithms or tables to control transmitter 14 to use spatial apodization and time delays to form a controlled and focused beam when the transducer array elements are fired.

The echo signals produced by each burst of ultrasonic energy reflect from objects located at successive ranges along each ultrasonic beam. Due to differences in the propagation paths between a reflecting point and each transducer element, the echo signals are not detected simultaneously and their amplitudes are not equal. For each transmit, the echo signals from transducer elements 12 are fed to respective receive channels 32 of receiver 16. Under the direction of beamformer controller 20, the receiver tracks the direction of the transmitted beam. The receiver imparts the proper receive focus time delays 34 to the received echo signals. The receive focus time delays can be computed in real-time by the beamformer controller or can be read from a look-up table. The time-delayed receive signals are summed in a receive beam summer 36 for each transmit firing to provide an echo signal that accurately represents the total ultrasonic energy reflected from a point located at a particular range along the ultrasonic beam.

In the conventional system, the beamsummed receive signals may be bandpass filtered and then supplied to a signal processor or detector 38. The bandpass filter (not shown) passes the desired signal components. Detector 38 converts the bandpass-filtered receive signals to display data. In the B-mode (gray-scale), this is the envelope of the signal, with some additional processing such as edge enhancement and logarithmic compression. A scan converter 40 receives the display data from detector 38 and converts the data into the desired image for display. These scan-converted acoustic data are processed by a video processor incorporated in display subsystem 42 and supplied for display on the display system monitor.

Figure 2:
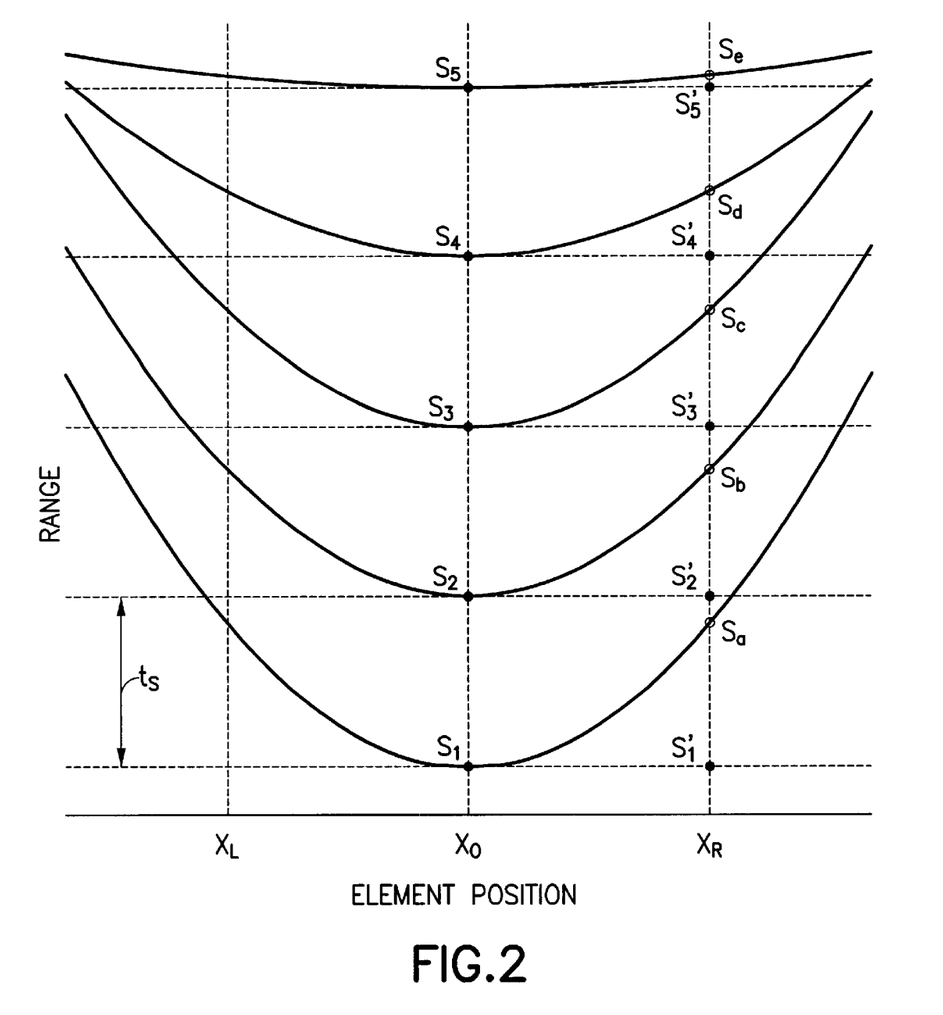
FIG. 2 is a schematic illustration of the implementation of dynamic receive focusing with a fixed sampling rate.

FIG. 2 illustrates the implementation of dynamic receive focusing with a fixed sampling rate. The signal received on the center element of the active aperture on a particular beam is sampled at equal time intervals $\tau_i = it_s$, where $i = 1, 2, 3, \ldots$, producing the values $S_1$, $S_2$, $S_3$, $S_4$, $S_5$, etc. These values correspond to a set of equally spaced ranges $R_i = c\tau_i/2$, where c is the assumed speed of propagation in the medium. Dynamic receive focusing means that at each range $R_i$, the sampling times for the signals on each element are chosen to focus the sum of the sampled element signals at depth $R_i$. The solid curves in FIG. 2 represent the ideal (non-uniform) sampling times as a function of element distance from the center of the active aperture, labeled $X_0$. The curves are symmetric about $X_0$ for the situation in which the set of receive focus locations lie on a line perpendicular to the transducer face. The change in the shape of the focusing curves is exaggerated for clarity. When the set of receive focus locations lie on a line which is not perpendicular to the transducer face, the range-dependent part of the ideal sampling times is also symmetric about the aperture center to a good approximation. The non-symmetric part of the ideal sampling times in this circumstance is independent of range and can be produced using a static, time-independent delay in each $\Delta$-$\Sigma$ data stream. This static delay does not produce the artifact which the invention seeks to reduce.

For an element at $X_R$, which is not at the center of the active aperture, the values $S_a$, $S_b$, $S_c$, $S_d$, $S_e$, ... at the ideal sampling times are not equally spaced in time, nor do they correspond to the sampling times for the center element. In a beamformer that utilizes interpolation, the signal values at the ideal sampling times are calculated from the values $S_1'$, $S_2'$, $S_3'$, $S_4'$, $S_5'$, ... sampled at equal time intervals using, for example, sinc interpolation or some approximation thereof. The same procedure is repeated on every element, and the resulting data streams are added, sample by sample, to produce a beam dynamically focused in range.

In the situation under consideration, the very small sampling interval $t_3$ produced by the $\Delta$-$\Sigma$ converter allows omission of the interpolation step and allows approximation of the signal at the desired sampling times by the nearest available sample. This produces the sequence of values $S_2'$, $S_3'$, $S_4'$, $S_5'$, .... Value $S_4'$ is duplicated in this example, since it is used as an approximation for both samples $S_c$ and $S_d$. Simple duplication of the value $S_4'$ produces an undesirable artifact, as previously described. But some value must be inserted into the $\Delta$-$\Sigma$ data stream from element $X_R$, $S_1'$, $S_2'$, $S_3'$, $S_4'$, $S_5'$, ..., so that value $S_5'$ from element $X_R$ will be delayed and added to the corresponding value $S_5$ from element $X_0$ in the summation step.

In accordance with a first preferred embodiment of the invention, the dynamic focus artifact in a $\Delta$-$\Sigma$ beamformer is corrected using a method wherein a pair of samples, +1 and −1, are always inserted when a delay is required. This method reduces the focusing artifact on each beamforming channel.

Figure 3:
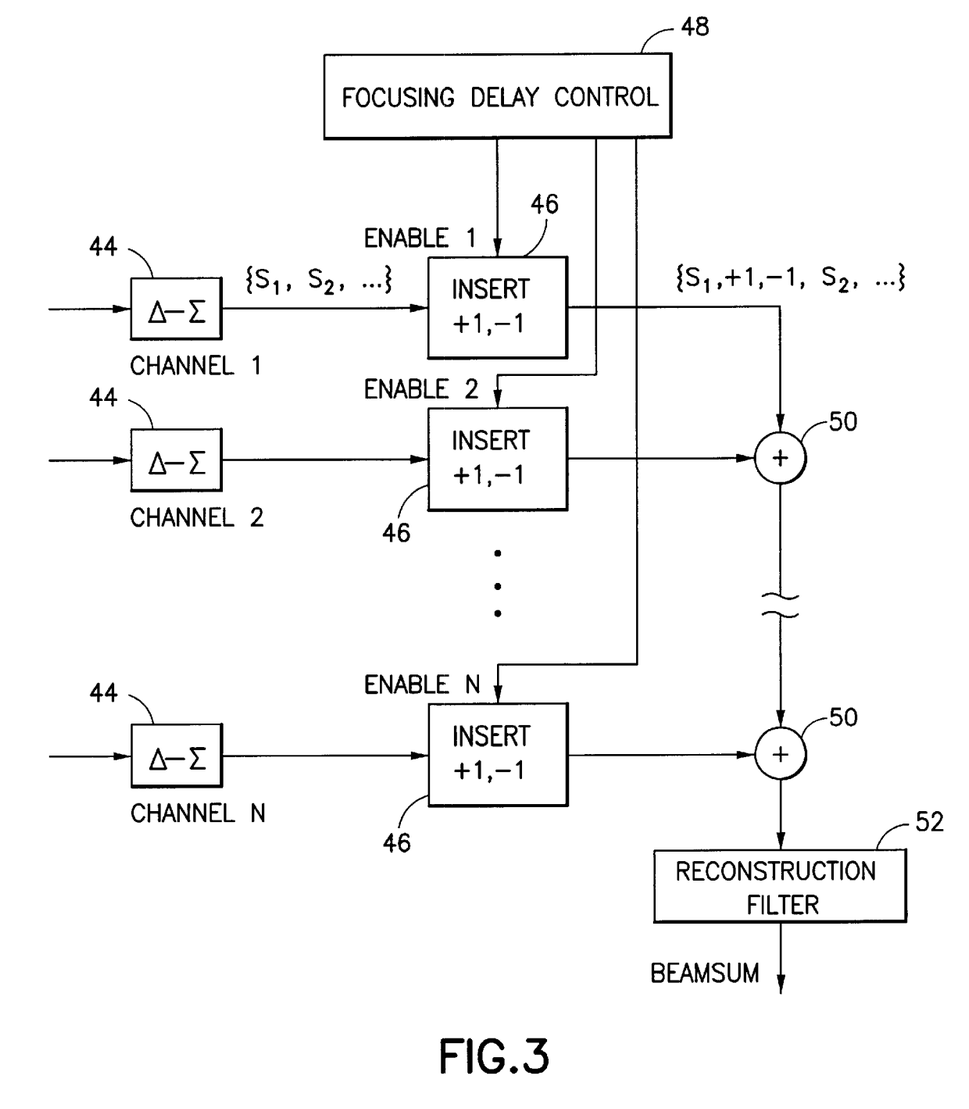
FIGS. 3–5 are block diagrams of delay artifact reduction schemes in accordance with three preferred embodiments of the invention.

FIG. 3 illustrates a generic $\Delta$-$\Sigma$ beamformer architecture and a delay artifact reduction scheme in accordance with the first preferred embodiment. The analog signal from each transducer element 1, 2, ..., N is converted to a one-bit data stream, e.g., $S_1$, $S_2$, ..., in a respective $\Delta$-$\Sigma$ converter 44. Here si can take on one of two values. In hardware implementations, these binary values are usually chosen to be the numerical values 0 and 1. In this embodiment they have been represented by −1 and +1 to emphasize that their sum corresponds to zero in a one-bit data stream, but this convention has been adopted for the sake of clarity only.

As seen in FIG. 3, each channel signal passes through a delay stage 46 controlled by a focusing delay control 48. The focusing delay control produces signals that properly delay each channel data stream to implement dynamic receive focusing. The delayed channel signals are added together in summers 50, and the resulting multi-bit data stream is passed through a reconstruction filter 52. The $\Delta$-$\Sigma$ converters 44 and reconstruction filter 52 are standard technology. By using the same reconstruction filter for all the $\Delta$-$\Sigma$ converters, hardware size is considerably reduced.

The particular delay method implemented by FIG. 3 is to insert +1/−1 pairs. For each time sample, focusing delay control 48 determines whether to add a delay to any given channel. Delay of each channel is controlled independently. For the sake of illustration, the $\Delta$-$\Sigma$ data stream for channel No. 1 is shown with an inserted +1/−1 pair. The minimum delay that can be added to one channel in this embodiment is two time samples.

In accordance with second and third preferred embodiments of the invention, the focus time delay artifact is not reduced on each beamforming channel, but rather is reduced in the beamsummed, reconstructed signal.

Figure 4:
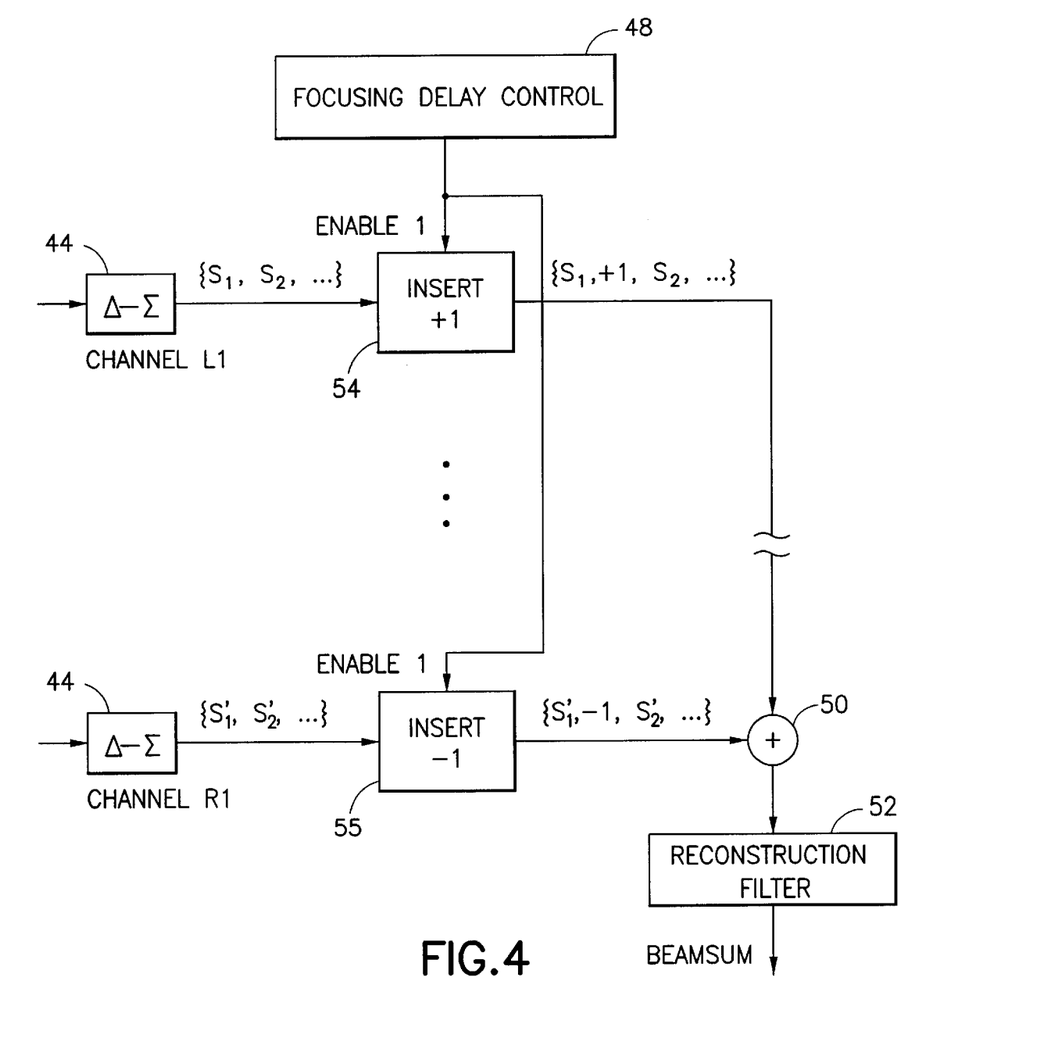

In the second preferred embodiment of the invention, a +1 is inserted on one channel and a −1 is inserted on the other channel of a pair of symmetric channels. The net effect on the beamsummed signal is zero, exactly as if a zero had been inserted on each of the two channels. FIG. 4 illustrates insertion of +1/−1 pairs on symmetric channels, such as those connected to the transducer elements at positions labeled $X_R$ and $X_L$ in FIG. 2. Each focus-enable line, which causes a delay to be inserted or not, controls a pair of channels chosen such that they have equal desired focusing delays for all ranges. In the example depicted in FIG. 4, a delay stage 54 inserts a +1 into the Δ-Σ data stream for channel L1, while a delay stage 55 inserts a −1 into the Δ-Σ data stream for channel R1. The inserted +1 and −1 cancel when the data streams for symmetric channels L1 and R1 are added in summer 50.

Figure 5:
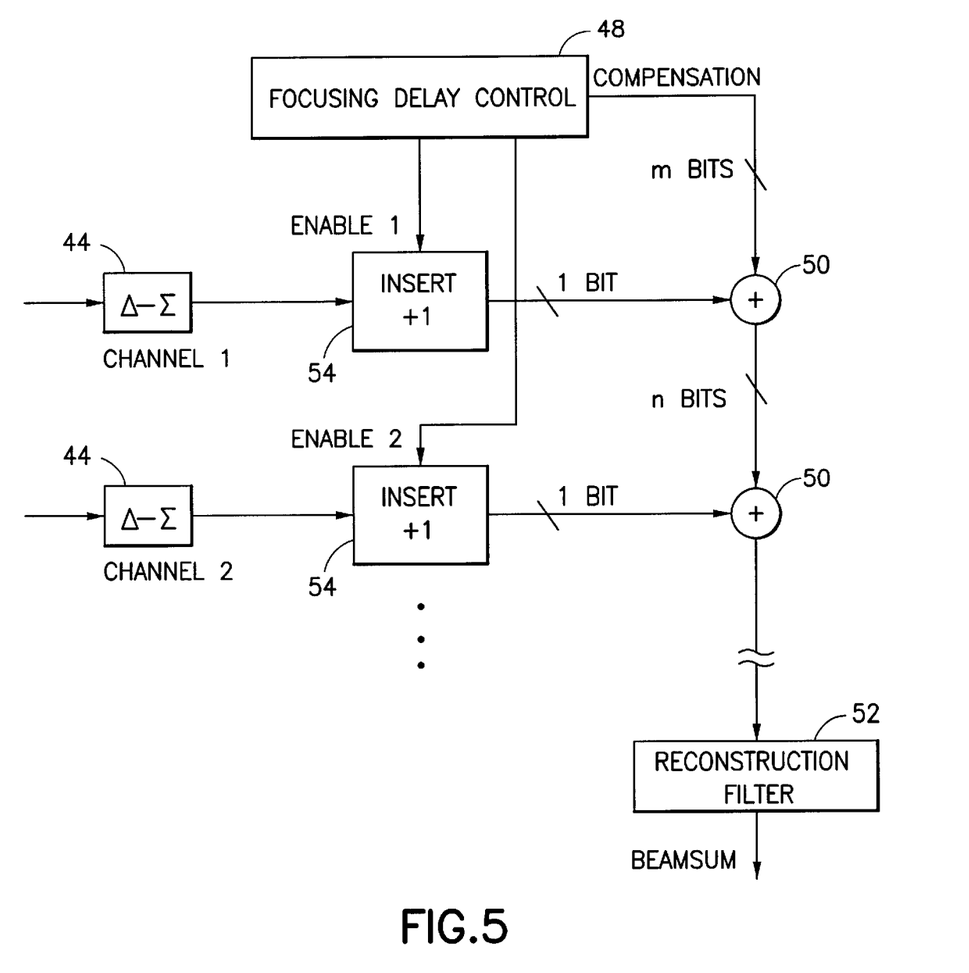

In a third preferred embodiment of the invention, shown in FIG. 5, a +1 sample is inserted when a focusing delay is required. This method either pre-calculates or counts the number of channels that are delayed at each time sample and subtracts this number from the beamsum. The net effect on the beamsum is the same as inserting a zero sample on every delayed channel.

FIG. 5 illustrates the general method of compensating for inserted samples by adding a compensation signal to the sum of the channel signals. In the situation illustrated, the delays are produced by inserting the value +1 (delay stages 54) into the channel data streams. The compensation value is added to the sum of the channel data which is equal and opposite to the number of +1's inserted at each time sample. Adding the compensation value to the sum reduces the artifact in the data stream following reconstruction filter 52.

The maximum number of bits m required in the compensation value is small, compared to the number of bits n required in the beamsum. The average number of focusing delays per active channel at each sample clock i is given by $$F_i = F_0 \quad \text{for } i \le i_{max} \quad (1)$$

$$= F_0(i_{max}/i)^2 \quad \text{for } i > i_{max}$$

where $$\text{where} \quad i_{max} = \frac{4a f_{min} \cos\theta}{c t_s} \quad (2)$$

is the first sample at which all the channels are active, and $$F_0 = \frac{t_s}{48 t_q f_{min}^2}. \quad (3)$$

Here $2a$ is the probe aperture width, θ is the beam steering angle, c is the speed of sound, $t_s$ is the sampling time interval, $t_q$ is the desired time-delay quantization size, and $f_{min}$ is the receive f-number which controls the element dynamic apodization schedule. Equations (1)–(3) are obtained assuming quadratic range-dependent focusing and using the approximation that sums over discrete channels can be replaced by integration. When the time-delay quantization is the sample rate, $t_q=t_s$, and taking $f_{min}=1$, the result is that, at most, about 2% of the array requires focus time delays for any given time sample, i.e., only three channels have delays inserted on a given time sample for a typical 128-channel beamformer. Thus the hardware required to add the compensation value can be very small.

The exact count can be obtained by adding the values on the delay-control (i.e., enable) lines to each time-delay unit. Hardware complexity can be reduced, however, by computing an approximate delay count. A good approximation to the exact count can be obtained by subdividing the channels into groups, and adding exactly an approximate count from each group. Channel groupings can be chosen so that only very rarely will more than one channel within any group be delayed simultaneously. Thus the approximate count can be obtained by simply coupling all the delay control lines for the channels in a group to a logical OR gate. Such channel groupings can be found because at any given instant of time, relatively few channels require focus delays.

Figure 6:
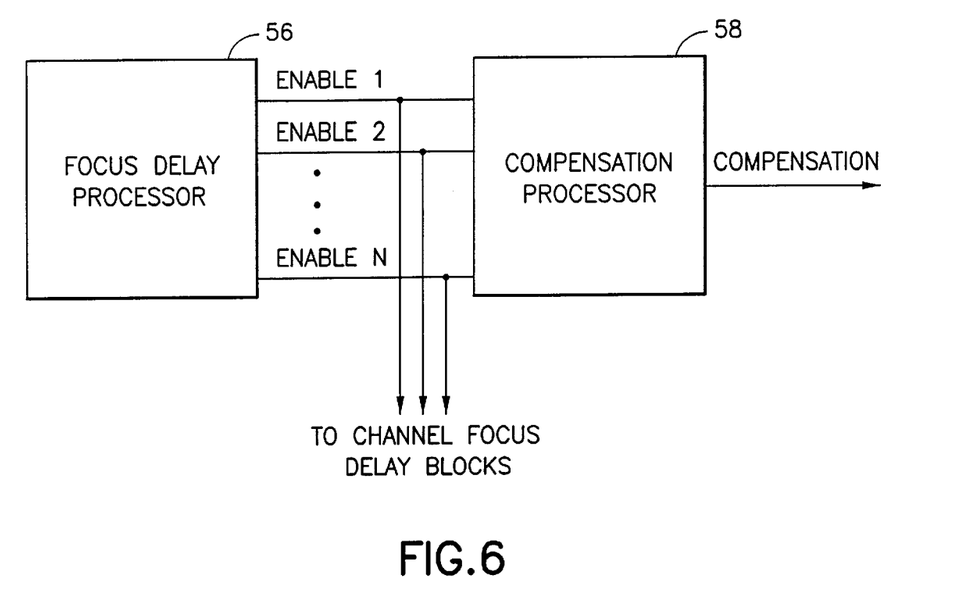
FIG. 6 is a block diagram of the preferred architecture of the focusing delay control depicted in FIG. 5.

The value to be added as compensation at each time sample can either be precomputed and stored as a list or calculated in real-time. If the value to be added as compensation is not precomputed, then a compensation processor is required. FIG. 6 shows a preferred embodiment of a focusing delay control comprising a focus delay processor 56 coupled to a plurality of channel focus delays by a respective plurality of enable lines which, in turn, are coupled to a respective plurality of inputs to a compensation processor 58. The one-bit enable signals for each channel—the same signals which control whether a delay is generated—are provided to compensation processor 58 which produces a multi-bit compensation value for each time sample.

Figure 7:
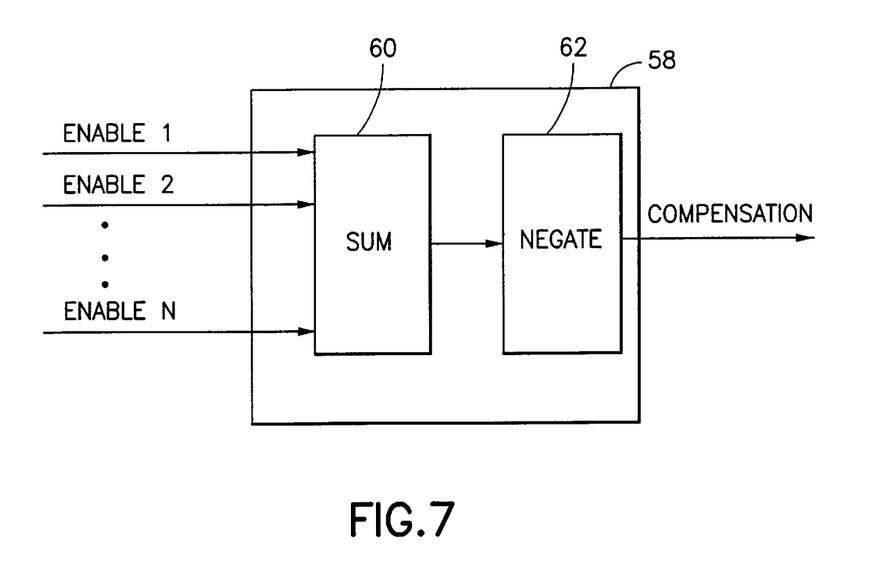
FIGS. 7 and 8 are block diagrams of respective schemes for calculating the compensation in accordance with the third preferred embodiment of the invention.

FIG. 7 shows a compensation processor 58 for calculating the compensation value. For each time sample, all of the focus enable signals are summed in a summer 60. This assumes that the enable signal is 1 when a delay is to be inserted on a given channel, and 0 when no delay is to be inserted. This sum value is then negated at a negate stage 62 to form the compensation value. For each time sample, a respective compensation value can be added to the respective summed signals.

Figure 8:
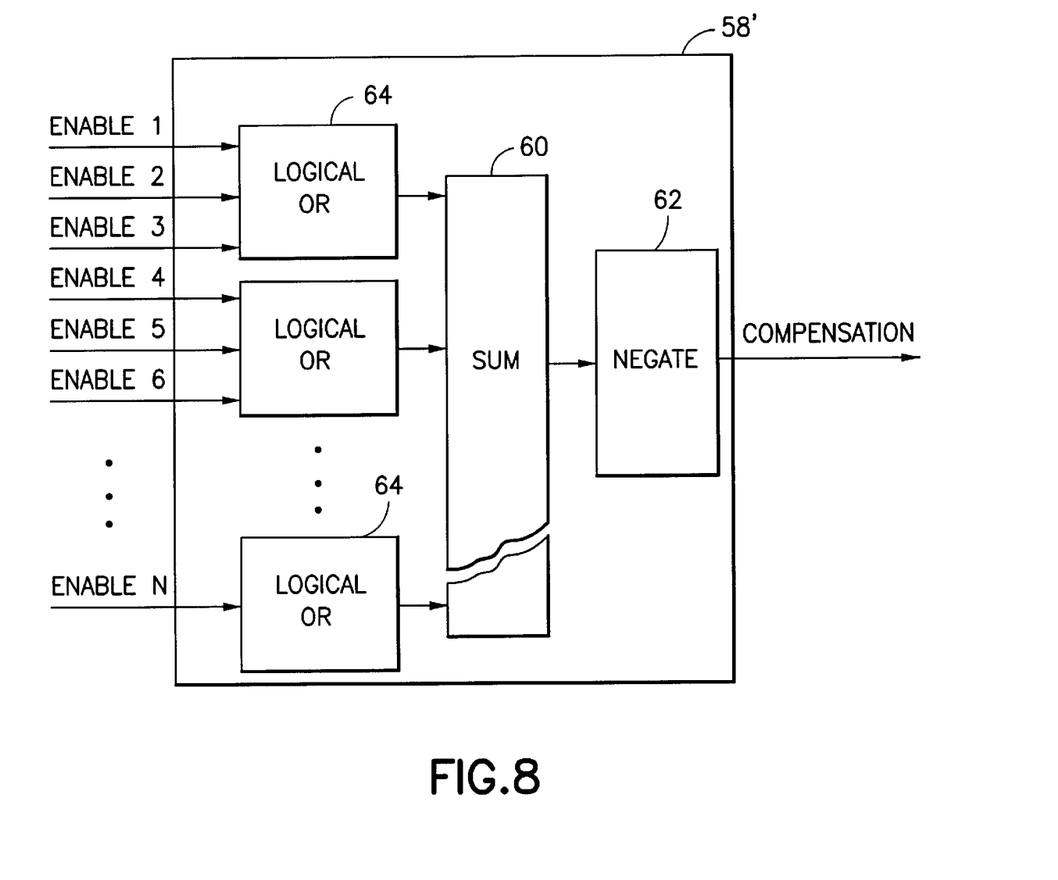

FIG. 8 shows another compensation processor 58 for calculating the compensation, which is of reduced hardware size and complexity in some instances. The channel focus enable signals are divided into groups, with three signals in each group being illustrated. The number of signals in each group is optimized for a particular application, so that there need not be the same number of signals in each group. The groups are chosen so that, at a given time sample, one enable signal, at most, is active (set to +1). This condition can be relaxed if it is desired to further minimize the hardware required, so that nearly always at most one enable signal is active. Since one enable signal, at most, is active within a group, summing the enable signals within the group is equivalent to a logical OR operation which, in comparison to the sum operation, is very efficient when implemented in hardware. Compensation processor 58' comprises a plurality of OR stages 64 corresponding to the groups of enable lines. The output signals of OR stages 64 are summed in summer 60, but since there are fewer than N signals to be summed (where N is the number of channels), summer 60, together with the OR stages, can be implemented more compactly in hardware compared with summing over all N enable signals. Again, the sum is negated at negate stage 62 to form the compensation value.

While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A method for introducing delay in a delta-sigma beamformer channel, comprising the steps of:

determining that a delay is required in a one-bit data stream on said delta-sigma beamformer channel; and inserting a pair of samples into said one-bit data stream when said delay is required, said samples of said pair having a zero sum.

2. A beamformer comprising:

a first delta-sigma analog-to-digital converter for producing a one-bit output data stream;

a first focusing delay stage connected to insert a first pair of samples into said output data stream of said first delta-sigma analog-to-digital converter in response to a focus-enable signal, wherein said samples of said first pair have a zero sum; and a focusing delay controller for issuing a focus-enable signal to said first focusing delay stage whenever a delay in said output data stream from said first analog-to-digital delta-sigma converter is required.

3. The beamformer as recited in claim 2, further comprising:

a second analog-to-digital delta-sigma converter for producing a one-bit output data stream;

a second focusing delay stage connected to insert a second pair of samples into said output data stream of said second delta-sigma analog-to-digital converter in response to a focus-enable signal, wherein said samples of said second pair have a zero sum; and a summer for summing the output data streams of said first and second focusing delay stages, wherein said focusing delay controller is adapted to issue a focus-enable signal to said second focusing delay stage whenever a delay in said output data from said second analog-to-digital delta-sigma converter is required.

4. A delta-sigma beamformer channel, comprising:

a delta-sigma analog-to-digital converter for producing a one-bit output data stream; and means for inserting a pair of samples into said one-bit output data stream when a delay is required, said samples of said pair having a zero sum.

5. A method for reducing dynamic focusing artifact in a delta-sigma beamformer, comprising the steps of:

determining that a delay is required in a one-bit data stream on each of a pair of delta-sigma beamformer channels;

inserting first and second samples into respective one-bit data streams of said pair of delta-sigma beamformer channels when said delay is required, said first and second samples having a zero sum; and summing said one-bit data streams of said pair of delta-sigma beamformer channels after the inserting step.

6. A beamformer comprising:

first and second delta-sigma analog-to-digital converters for producing respective one-bit output data streams;

first and second focusing delay stages for inserting first and second samples into said output data streams of said first and second delta-sigma analog-to-digital converters, respectively, in response to respective focus-enable signals, said first and second samples having a zero sum;

a focusing delay controller for issuing focus-enable signals to said first and second focusing delay stages, respectively, whenever a delay in said output data streams from said first and second delta-sigma converter is required; and a summer for summing the output data streams of said first and second focusing delay stages.

7. The beamformer as recited in claim 6, further comprising a reconstruction filter coupled to an output of said summer.

8. An imaging system comprising:

first and second transducer elements for transmitting wave energy in response to electrical activation and for transducing returned wave energy into analog electrical signals;

first and second delta-sigma beamformer channels respectively connected to receive analog electrical signals from said first and second transducer elements, each of said delta-sigma beamformer channels being adapted to provide a respective one-bit output data stream;

first and second focusing delay stages connected to insert first and second samples into said respective one-bit output data streams in response to focus-enable signals, said first and second samples having a zero sum;

a beamformer controller for sending said focus-enable signals to said first and second focusing delay stages when a dynamic focusing delay is required in said first and second delta-sigma beamformer channels;

a beamsummer for summing the output signals of said first and second delta-sigma beamformer channels; and a display subsystem for displaying an image having an image portion which is a function of a summed output signal of said beamsummer, said sumned output signal comprising the summed output signals of said first and second delta-sigma beamformer channels.

9. A beamformer comprising:

a first delta-sigma analog-to-digital converter having an output for producing a first one-bit data stream;

first sample inserting means for inserting a first sample into said first one-bit data stream when a delay is required;

a second delta-sigma analog-to-digital converter having an output for producing a second one-bit data stream;

second sample inserting means for inserting a second sample into said second one-bit data stream when said delay is required; and a summer for summing output signals of said first and second sample inserting means, said first and second samples having a zero sum.

10. The beamformer as recited in claim 9, further comprising a reconstruction filter connected to receive an output signal from said summer.

11. A method for reducing dynamic focusing artifact in a delta-sigma beamformer having a plurality of delta-sigma beamformer channels responsive to a signal received at transducer elements, said method comprising the steps of:

taking a time sample of the signal received at a center transducer element of an active aperture on a particular receive beam;

for each time sample, determining which delta-sigma beamformer channels require a delay in one-bit data stream output signals therefrom for dynamic focusing;

for each delta-sigma beamformer channel requiring a delay in its respective one-bit data stream output signal, inserting a sample of predetermined value when said delay is required;

for each time sample, determining a compensation value equal to the sum of the predetermined sample values inserted into the respective beamformer channels; and for each time sample, summing the values of all of the one-bit data stream output signals of said beamformer and said compensation value.

12. The method as recited in claim 11, wherein the step of determining a compensation value comprises the steps of summing the number of focusing delays for each time sample to achieve a resulting summed value, and negating said resulting summed value.

13. A beamformer comprising:

a multiplicity of delta-sigma analog-to-digital converters for producing respective one-bit output data streams;

a multiplicity of focusing delay stages for respectively receiving said output data streams from said multiplicity of delta-sigma analog-to-digital converters, each of said focusing delay stages being adapted to insert a sample into the output data stream of a respective delta-sigma analog-to-digital converter if a focus-enable signal is received, each of said samples having the same sample value;

a focusing delay controller coupled to said multiplicity of focusing delay devices via a respective multiplicity of enable lines, said focusing delay controller being programmed to perform the steps of:
 (a) issuing a focus-enable signal on a corresponding enable line whenever a delay in the output data stream from a respective delta-sigma analog-to-digital converter is required, and
 (b) determining a compensation value equal to the sum of the sample values inserted at a time sample; and a summer for summing the data values of all of the one-bit output data streams and the compensation value for said time sample.

14. The beamformer as recited in claim 13, further comprising a reconstruction filter connected to receive an output signal from said summer.

15. The beamformer as recited in claim 13, wherein said focusing delay controller comprises a focus delay processor programmed to perform step (a) and a compensation processor programmed to perform step (b).

16. The beamformer as recited in claim 15, wherein said compensation processor comprises means for summing the number of focus-enable signals issued by said focus delay processor at a time sample, and means for negating the summed value produced by said means for summing.

17. A beamformer comprising:

a multiplicity of delta-sigma analog-to-digital converters for producing respective one-bit output data streams;

a multiplicity of focusing delay stages for respectively receiving said output data streams from said multiplicity of delta-sigma analog-to-digital converters, each of said focusing delay stages being adapted to insert a sample into the output data stream of a respective delta-sigma analog-to-digital converter if a focus-enable signal is received, each of said samples having the same sample value;

a focusing delay controller coupled to said multiplicity of focusing delay stages via a respective multiplicity of enable lines, said focusing delay controller being programmed to perform the steps of:
 (a) issuing a focus-enable signal on a corresponding enable line whenever a delay in the output data stream from a respective delta-sigma analog-to-digital converter is required, and
 (b) determining a compensation value by estimating the sum of the sample values inserted at a time sample; and a summer for summing the data values of all of the one-bit output data streams and the compensation value for said time sample.

18. The beamformer as recited in claim 17, wherein said focusing delay controller comprises a focus delay processor programmed to perform step (a) and a compensation processor programmed to perform step (b).

19. The beamformer as recited in claim 18, wherein said compensation processor comprises a plurality of logical OR stages for detecting issuance of a focus-enable signal on any enable line of a respective group of enable lines at a time sample, means for summing output signals of said OR stages, and means for negating the value of the summed output signals.

20. An imaging system comprising:

a multiplicity of transducer elements for transmitting wave energy in response to electrical activation and for transducing returned wave energy into analog electrical signals;

a multiplicity of delta-sigma beamformer channels respectively connected to receive analog electrical signals from said multiplicity of transducer elements, each of said delta-sigma beamformer channels being adapted to provide a respective one-bit output data stream;

a multiplicity of focusing delay stages respectively connected to insert a sample into said respective one-bit data stream if a focus-enable signal is received, wherein each sample has the same sample value;

a focusing delay controller coupled to said multiplicity of focusing delay devices via a respective multiplicity of enable lines, said focusing delay controller being programmed to perform the steps of:
 (a) issuing a focus-enable signal on a corresponding enable line whenever a delay in a respective one-bit output data stream is required, and
 (b) determining a compensation value equal to the sum of the sample values inserted at a time sample;

a beamsummer for summing the data values of all of the one-bit output data streams and the compensation value for said time sample; and a display subsystem for displaying an image having an image portion which is a function of the output signal of said beamsummer.

* * * * *